July 22, 1958 — H. KRAUS — 2,844,700
HEATING APPARATUS
Filed Nov. 16, 1955

INVENTOR
HARRY KRAUS
BY M. C. Freudenberg
ATTORNEY

United States Patent Office 2,844,700
Patented July 22, 1958

2,844,700

HEATING APPARATUS

Harry Kraus, Newburgh, N. Y., assignor to Westinghouse Electric Corporation, East Pittsburgh, Pa., a corporation of Pennsylvania Application November 16, 1955, Serial No. 547,094

5 Claims. (Cl. 219—35)

This invention pertains to a sheathed electrical resistance heater for an oven and has as an object to improve the heat distribution therefrom.

This invention is an improvement over the oven heater invention that is claimed in the copending application of Eugene J. Barnett, Serial No. 548,311, filed November 22, 1955, assigned to the assignee of the present invention.

Another object of this invention is to obtain good heat distribution in an oven from a sheathed electrical heater having a shape that is economical to manufacture.

Another object of this invention is to improve the heat distribution from a heater of the above-mentioned type when used in an oven having its greatest heat losses adjacent the oven door and to maintain the temperatures of the exterior surface of the oven door at a level that is comfortable to the touch.

In accordance with this invention, an electrical heater, formed in a loop, is placed parallel to and spaced a short distance from the bottom of a box-shaped oven. A front portion of the heater loop extends along the oven door where the heat losses are the greatest and is bowed inwardly away from the door near the center thereof. A second and shorter portion of the heater loop extends along the rear wall of the oven. The front corners of the heater loop are closer to the front corners of the oven than are the rear corners of the heater with respect to the rear corners of the oven. The heater loop is completed by two straight sides joining the front and rear heater portions and converging toward the latter at the rear of the oven. This heater configuration and location help maintain a more nearly uniform temperature throughout the oven interior and keep the temperatures of the exterior of the oven door at a comfortable level.

These and other objects are effected by the invention as will be apparent from the following description and claims taken in connection with the accompanying drawing, forming a part of this application, in which:

Figure 1:
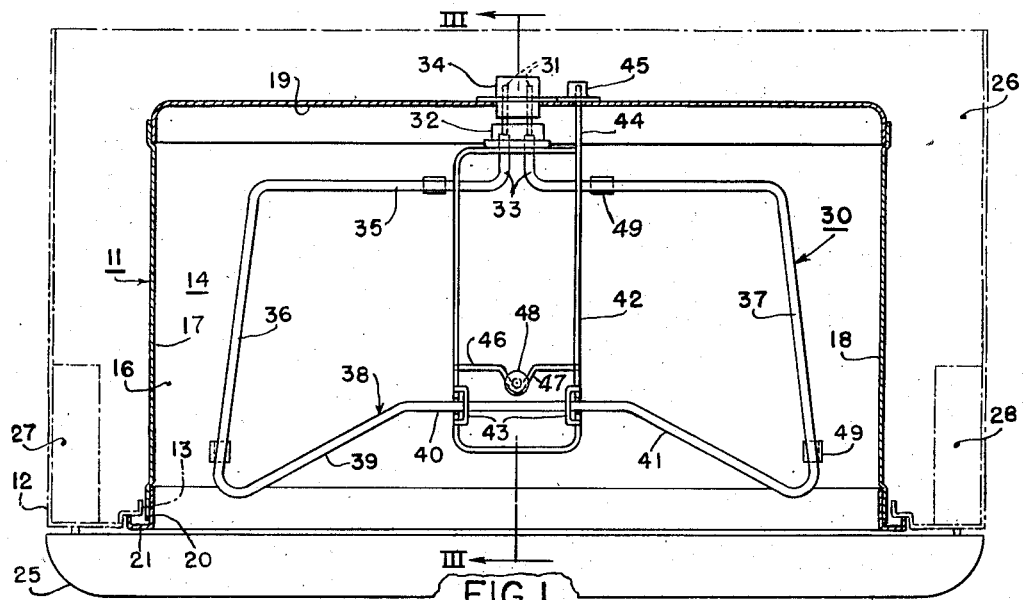
Fig. 1 is a horizontal section of an oven, showing an oven door, an oven heater in plan and the supporting frame for the oven and door in phantom.
Figure 2:
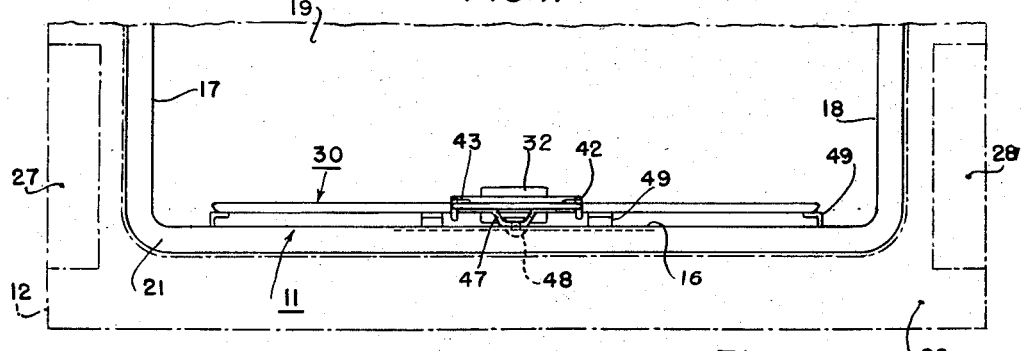
Fig. 2 is a front view of the oven of Fig. 1 without the door and with the upper half of the oven cut away.

Referring to Fig. 1, an oven comprises an open front rectangular box-shape liner 11 supported within a frame 12. The frame 12 (shown in phantom) has an opening 13 within which lies the open front end of the liner 11, the rear portion of the liner 11 being supported within the frame 12 in any suitable manner (not illustrated). The liner 11 is formed by a sheet metal wrapper 14 bent to form its top wall 15, bottom wall 16 and side walls 17 and 18, respectively. A shallow metal pan 19 is attached to the wrapper 14 to form the rear liner wall. A throat member 20 extends into the front end of the wrapper 14 and has an outwardly extending flange 21 that engages the front of the frame 12 to help position the liner 11. A door 25 forming a closure for the liner 11 is pivotally supported adjacent its lower edge by the frame 12. The width of the oven, between walls 17 and 18, is greater than the depth of the oven from the door 25 to the rear wall 19.

The door 25 and the space 26 within the frame surrounding the liner 11 are filled with any suitable heat insulating material (not shown) to impede the loss of heat from within the inner oven liner 11. At the sides of the liner adjacent the lower front portions thereof, spaces 27 and 28 are devoid of insulating material as they house some suitable counter-balancing mechanisms (not shown) for supporting the door.

A sheathed electrical resistance heater 30 in the form of a large horizontal loop is supported near the bottom wall 16 of the liner 11 in a plane parallel thereto. The heater comprises a tubular metal sheath through which a coiled resistance element extends. The sheath contains a suitable insulating material to electrically insulate the resistance element therefrom. Details of the resistance element and the insulating material are omitted as they are well known in the electrical heating art. Electrical connections to the resistance element within the heater are made through a pair of male terminals 31 extending rearwardly from an electrically insulating terminal block 32 attached to the ends 33 of the heater sheath at the rear of the heater 30. These male terminals 31 plug into a receptacle 34 that is attached to the rear wall 19 of the liner 11 and contains connections to a suitable power source.

The heater loop 30 as seen from Fig. 1 has a relatively straight rear portion 35 divided by the heater terminal connections and extending parallel to the rear liner wall 19. The sides 36 and 37 of the heater loop are straight and diverge toward the front of the oven. A front portion 38 of the heater connecting the two sides 36 and 37 is longer than the transversely extending rear portion 35. The front heater portion 38 comprises three straight sections 39, 40 and 41. The center section 40 is parallel to the oven door 25 and the end sections 39 and 41 are equal in length, making the same angle with the center section 40. The end sections 39 and 41 diverge toward the front of the heater and form acute angles with the heater sides 36 and 37, respectively. The front corners of the heater 30 are more widely spaced than are the rear heater corners and extend closer to the door 25 and the side walls 17 and 18 of the liner than do the rear heater corners with respect to the rear wall 19 and side walls 17 and 18 of the liner. Thus, there is a greater supply of heat in the front corners of the oven than at the rear corners thereof.

The improvement in the heater of this invention, over the invention claimed in the above-mentioned application of Eugene J. Barnett, resides in the inwardly bowed configuration of the front portion of the heater.

The increased spacing between the door 25 and the center section 40 of the heater portion 38, where the latter is bowed away from the door, reduces the amount of heat picked up by the door due to direct radiation by the heater. Although the central section 40 of the front heater portion 38 is farther from the door than are the ends thereof, the total heat supplied near the front of the oven is sufficient to overcome the greater heat losses around the door. The bowed configuration of the front of the heater 30 not only provides enough heat to help overcome losses at the front of the oven, but it also is desirable in wide ovens to provide additional heat to the center of the oven to maintain more uniform temperatures throughout the oven interior. The heater configuration and heat distribution pattern are symmetrical about a vertical centerplane extending from front to rear through the oven.

Figure 3:
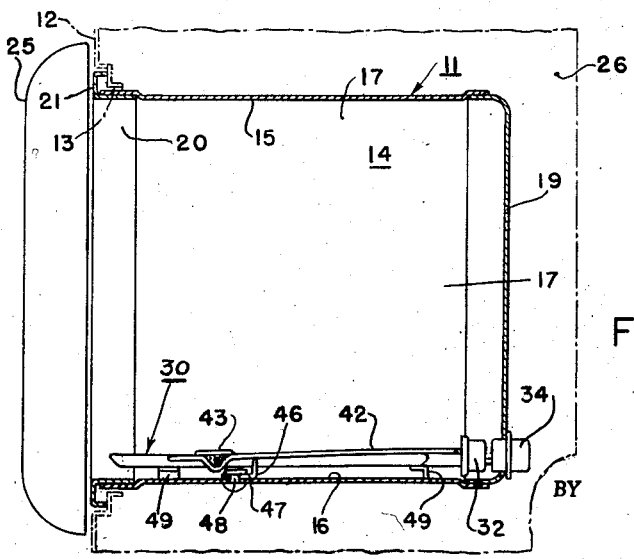
Fig. 3 is a vertical section taken on line III—III of Fig. 1.

Attached to the sheath of the heater 30 is a wire loop 42 that serves as a handle for plugging in and unplugging the heater 30 and also provides support for part of the heater. The wire loop 42 is indented, as seen in Fig. 3, near the front end thereof to receive the front heater portion 40. Wire bridging pieces 43 welded to the loop retain the heater loosely in the indentations. The rear of the wire loop 42 bridges the ends 33 of the heater and is welded to the sheath of the heater 30. A rearward extension 44 of the wire loop 42 is electrically grounded within a receptacle 45 on the rear of the oven liner 11. Extending across the wire loop within the heater loop is a wire support 46. The support has a V-shaped portion 47 resting on the bottom wall 16 of the liner. This V-shaped portion 47 opens toward the rear of the oven and straddles a pin 48 fixed on the bottom wall 16 of the liner to centrally locate the heater with respect to the sides of the oven. A plurality of L-shaped lugs 49 welded to the heater sheath, together with the plug-in terminals 31 and the wire member 42, support the heater spaced from the bottom wall 16. The lugs 49 slide freely on the bottom wall 16, permitting unrestricted expansion and contraction of the heater 30 during heating and cooling.

Sheathed heaters of the type referred to above are manufactured by filling the sheath with the resistance element and insulating material before the sheath is bent to its desired configuration. The resistance element has uniform electrical resistance per unit length to provide a uniform heat output per unit length along the heater. The available materials that are suitable for use in mass production of these heaters at low cost limit the maximum wattage density along the heater. Thus, for a minimum wattage, there is usually a minimum practical length for such a heater. The total cost of a sheathed heater is dependent in part on the amount of bending necessary to give it its final shape. The simplest bends involve a minimum cost for the labor and tools to make them.

The configuration of the heater 30 keeps the cost of bending it at a minimum, since the bent portions of the sheath are a relatively small portion of its total length. The configuration set forth above for the heater 30 provides a relatively long heater with a relatively low wattage density. This configuration also provides a desirable heat distribution path to maintain more nearly uniform temperatures at both the inside and outside of the heater loop 30 within the oven.

An ideal condition of heat distribution would be that which would maintain the same temperature in all parts of the oven interior. The heat losses from the oven are greatest around the oven opening, due to the lesser amount of thermal insulation in the spaces 27 and 28, the conduction of heat from the open end of the liner 11 to the frame 12, and the heat losses through the door 25 and between the door 25 and the frame 12. The door of an oven does not usually have the thickness of thermal insulating material that is present in the other walls because the insulating material is displaced in various parts of the door by structural members needed therein to give the door rigidity and to provide for its support from the oven frame.

Since the heat losses are greatest around the front of the oven, the heater 30 is arranged so that its front portion 38 extends near the door 25 and side walls 17 and 18 of the oven to supply additional heat to overcome these greater heat losses. The front corners of the heater 30 extend further into the forward corners of the oven to provide a more concentrated supply of heat therein than is provided at the rear corners of the oven by the rear corners of the heater. By supplying a greater amount of heat directly to the areas where the heat losses are greatest, there is a minimum flow of heat to these areas from other parts of the oven. The heater shape described above supplies enough additional heat at the front of the oven to equalize temperatures at the inside and outside of the heater loop throughout the oven interior and also provides this additional supply of heat without subjecting the door to uncomfortably high temperatures.

While I have shown my invention in but one form, it will be obvious to those skilled in the art that it is not so limited, but is susceptible of various changes and modifications without departing from the spirit thereof.

What I claim is:

1. A sheathed electrical resistance heater for a rectangular box-shaped oven having its greatest heat losses along a door forming a vertical front side thereof, said heater being bent in a planar loop having a front bowed heating portion, a pair of straight sides converging in the direction away from said front portion and a rear heating portion extending between said sides, the front corners of said heater formed by junctions of said sides and said front portion being more widely spaced than the rear corners of said heater formed by the junctions of said sides and said rear heater portion, said front heater portion being longer than said rear portion to supply additional heat along said door to overcome the greater heat losses when said heater is supported near the bottom of said oven with said front portion along said door, said front portion comprising a pair of straight sections extending from the front corners and converging inwardly toward the center of said loop to provide a supply of heat to the center of the oven to maintain a more nearly uniform temperature throughout the oven interior and to reduce the amount of heat radiated directly from said front heater portion to said door.

2. A sheathed electrical resistance heater for a rectangular box-shaped oven having its greatest heat losses along a door forming a vertical front side thereof, said heater being bent in a planar loop having a front bowed heating portion, a pair of straight sides converging from the front to the rear of the oven and a rear heating portion extending between said sides, the front corners of said heater formed by junctions of said sides and said front portions being more widely spaced than the rear corners of said heater formed by junctions of said sides and said rear heater portions, said front heater portion being longer than said rear portion to supply additional heat along said door to overcome the greater heat losses therealong when the heater is supported near the bottom of the oven with said front portion along the door, said front portion comprising a pair of sections converging inwardly toward the center of said loop to provide a supply of heat to the center of the oven for maintaining a more nearly uniform temperature through the oven and to reduce the amount of heat directed from the front heater portion to the oven door, each of said front and rear heater portions being longer than either of said heater sides.

3. A sheathed electrical resistance heater for a rectangular box-shaped oven having its greatest heat losses along a door forming one vertical side thereof, said heater being bent in a planar loop having a front portion, a pair of sides converging in the direction away from said front portion and a rear heating portion extending between said sides, said front portion having a center section and forwardly diverging end sections, said end sections and said heater sides forming acute angles at the front corners of said heater loop, the front corners of said loop being more widely spaced than the rear corners of said heater loop, said front heater portion being longer than said rear portion to supply sufficient heat along said door to help overcome the greater heat losses therealong when said heater is supported near the bottom of said oven with said front portion along said one vertical side, said center section of the front of said heater extending inwardly toward the center of the heater loop to supply heat to the center of said loop to help maintain a more nearly uniform temperature throughout the oven interior and to reduce the amount of heat radiated directly from said front heater portion to said door.

4. An oven comprising a frame, an insulated oven liner having an open front end and supported by said frame, an insulated door forming a closure for the open front end of said liner, and a sheathed electrical resistance heater supported within said liner near the bottom thereof for heating said oven, said oven being generally rectangular in horizontal section and having its greatest heat losses at the side thereof formed by said door, said heater being bent in a horizontal loop having a front inwardly bowed portion, a pair of sides joined to the ends of said bowed portion and converging toward the rear of the oven portion and a rear heating portion extending between said sides, said front heater portion being longer than said rear portion, the latter extending along a rear wall of the oven, said front heater portion comprising end sections diverging forwardly toward the front corners of the oven, said front portion extending along said door with its ends nearer the lower front corners of the oven than are the ends of said rear heater portion with respect to the lower rear corners of the oven, the inwardly bowed portion of said heater providing more heat for the center of said oven and reduced heat radiated directly from said front heater portion to said door.

5. An oven comprising a frame, an insulated oven liner having an open front end and supported by said frame, an insulated door forming a closure for the open front end of said liner, and a sheathed electrical resistance heater supported within said liner near the bottom thereof for heating said oven, said oven having its greatest heat losses at the side thereof formed by said door, said heater being bent in a horizontal loop having a front heating portion extending along said door, a pair of sides converging toward the rear of said liner, and a rear heating portion extending between said sides along a rear wall of said liner, said front heater portion having a center section extending inwardly toward the center of said loop to provide more heat to the center of said loop and reduce the amount of heat radiated directly therefrom to said door, the ends of said front portion diverging toward the front of said oven and forming acute angles with said heater sides at the front corners of said heater loop, said front corners being more widely spaced than the rear corners of said loop at the junctions of said sides and said rear heater portion, said front heater portion being longer than said rear portion to provide more heat along said door to help overcome the greater heat losses around said door.

References Cited in the file of this patent

UNITED STATES PATENTS

| 1,359,400 | Lightfoot | Nov. 16, 1920 |
| 1,555,542 | Young | Sept. 29, 1925 |
| 1,982,386 | Heinbuch | Nov. 27, 1934 |
| 2,180,600 | Mills | Nov. 21, 1939 |
| 2,221,595 | Lockwood | Nov. 12, 1940 |
| 2,622,181 | Sheidler | Dec. 16, 1952 |

FOREIGN PATENTS

| 51,804 | Norway | Nov. 21, 1932 |